US011618796B2

(12) United States Patent
Fornof et al.

(10) Patent No.: US 11,618,796 B2
(45) Date of Patent: *Apr. 4, 2023

(54) SELF-WETTING ADHESIVE COMPOSITION

(71) Applicant: 3M INNOVATIVE PROPERTIES COMPANY, St. Paul, MN (US)

(72) Inventors: Ann R. Fornof, Austin, TX (US); Carla S. Thomas, Woodbury, MN (US); Tien Yi T. H. Whiting, St. Paul, MN (US); Payam Khodaparast, St. Paul, MN (US); Nathaniel K. Naismith, Woodbury, MN (US); Brett J. Sitter, Cottage Grove, MN (US); James A. Thielen, Hugo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 795 days.

This patent is subject to a terminal disclaimer.

(21) Appl. No.: 16/487,265

(22) PCT Filed: Feb. 19, 2018

(86) PCT No.: PCT/US2018/018631
§ 371 (c)(1),
(2) Date: Aug. 20, 2019

(87) PCT Pub. No.: WO2018/152469

PCT Pub. Date: Aug. 23, 2018

(65) Prior Publication Data
US 2021/0130521 A1 May 6, 2021

Related U.S. Application Data

(60) Provisional application No. 62/623,396, filed on Jan. 29, 2018, provisional application No. 62/461,153, filed on Feb. 20, 2017.

(51) Int. Cl.
C08F 220/18 (2006.01)
C09J 7/38 (2018.01)
(Continued)

(52) U.S. Cl.
CPC ...... C08F 220/1808 (2020.02); C08F 220/06 (2013.01); C08F 220/14 (2013.01);
(Continued)

(58) Field of Classification Search
CPC .......... C08F 220/1808; C08F 220/1804; C08F 220/1811; C08F 220/06; C08F 220/14;
(Continued)

(56) References Cited

U.S. PATENT DOCUMENTS 5,175,030 A 12/1992 Lu
5,183,597 A 2/1993 Lu
(Continued)

FOREIGN PATENT DOCUMENTS

EP 2408608 1/2012
EP 2 526 159 A1 11/2012
(Continued)

OTHER PUBLICATIONS

Paul, "How Thermodynamics Drives Wet-out in Adhesive Bonding: Correcting Common Misconceptions", Journal of Adhesion Science and Technology, 2008, vol. 22, pp. 31-45.
International Search Report for PCT International Application No. PCT/US2018/018631, dated Jun. 1, 2018, 5 pages.

*Primary Examiner* — Michael M. Bernshteyn
(74) *Attorney, Agent, or Firm* — Ann K. Gallagher

(57) ABSTRACT

According to various embodiments of the present disclosure, a composition includes about 5 to about 40 parts by weight of a solute copolymer component. The solute component optionally has one $T_g$ or $T_m$ of at least 25° C. The composition further includes about 60 to about 95 parts by weight
(Continued)

of a solvent monomer. The solvent monomer component includes (meth)acrylate monomers and a multifunctional acrylate. The sum of the solute copolymer component and the solvent monomer component is 100 parts by weight. The composition further includes about 5 to about 100 parts of a plasticizer, relative to the 100 parts. The plasticizer component comprises at least one plasticizer comprising an acid group.

20 Claims, 6 Drawing Sheets

(51) Int. Cl.

| | | |
|---|---|---|
| *C08F 220/06* | (2006.01) | |
| *C08F 220/14* | (2006.01) | |
| *C08F 220/20* | (2006.01) | |
| *C08F 236/20* | (2006.01) | |
| *C08K 5/06* | (2006.01) | |
| *C08K 5/09* | (2006.01) | |
| *C08L 31/04* | (2006.01) | |
| *C08L 53/00* | (2006.01) | |
| *C09J 4/00* | (2006.01) | |

(52) U.S. Cl.
CPC .......... *C08F 220/1804* (2020.02); *C08F 220/1811* (2020.02); *C08F 220/20* (2013.01); *C08F 236/20* (2013.01); *C08K 5/06* (2013.01); *C08K 5/09* (2013.01); *C08L 31/04* (2013.01); *C08L 53/00* (2013.01); *C09J 4/00* (2013.01); *C09J 7/38* (2018.01); *C09J 2203/318* (2013.01); *C09J 2301/122* (2020.08); *C09J 2431/00* (2013.01); *C09J 2433/00* (2013.01); *C09J 2453/00* (2013.01)

(58) Field of Classification Search
CPC ......... C08F 220/20; C08F 236/20; C09J 7/38; C09J 4/00; C09J 2301/122; C09J 2203/318; C09J 2431/00; C09J 2433/00; C09J 2453/00; C08K 5/06; C08K 5/09; C08L 31/04; C08L 53/00
USPC ........................................ 428/355
See application file for complete search history.

(56) References Cited

U.S. PATENT DOCUMENTS

| | | | |
|---|---|---|---|
| 5,679,762 A | 10/1997 | Yoshida | |
| 5,869,598 A * | 2/1999 | Yoshida | .............. C08F 293/00 |
| | | | 528/364 |
| 7,328,638 B2 | 2/2008 | Gardiner | |
| 7,350,442 B2 | 4/2008 | Ehnes | |
| 9,447,309 B2 * | 9/2016 | Fornof | .................. C09J 133/08 |
| 2004/0137222 A1 * | 7/2004 | Welke | ...................... C09J 7/385 |
| | | | 428/343 |
| 2008/0299388 A1 * | 12/2008 | Murakami | .............. C09J 7/385 |
| | | | 522/182 |
| 2010/0137469 A1 * | 6/2010 | Zhu | ...................... C07D 203/08 |
| | | | 546/208 |
| 2016/0130482 A1 * | 5/2016 | Fornof | ...................... C09J 4/06 |
| | | | 524/109 |
| 2017/0362399 A1 * | 12/2017 | Lipscomb | .................. C08J 5/18 |

FOREIGN PATENT DOCUMENTS

| | | | | |
|---|---|---|---|---|
| JP | 08165462 | | 6/1996 | |
| JP | 2006328094 | | 12/2006 | |
| JP | 2006328094 A | * | 12/2006 | |
| JP | 2011037971 | | 2/2011 | |
| KR | 20110068436 | | 6/2011 | |
| WO | WO 2000-48037 | | 8/2000 | |
| WO | WO 2000-56828 | | 9/2000 | |
| WO | WO 2009-085662 | | 7/2009 | |
| WO | WO 2010-132176 | | 11/2010 | |
| WO | WO 2011-059939 | | 5/2011 | |
| WO | WO 2014-209599 | | 12/2014 | |
| WO | WO 2014-209644 | | 12/2014 | |
| WO | WO-2014209644 A1 | * | 12/2014 | ............ C09J 133/08 |
| WO | WO 2015-077161 | | 5/2015 | |
| WO | WO 2015-108765 | | 7/2015 | |
| WO | WO 2016-089805 | | 6/2016 | |
| WO | WO 2016-094277 | | 6/2016 | |
| WO | WO 2016-094280 | | 6/2016 | |
| WO | WO 2016-190402 | | 12/2016 | |
| WO | WO 2017-112453 | | 6/2017 | |
| WO | WO 2017-112458 | | 6/2017 | |
| WO | WO 2017-112468 | | 6/2017 | |
| WO | WO 2017-112537 | | 6/2017 | |
| WO | WO 2017-112564 | | 6/2017 | |
| WO | WO 2017-214007 | | 12/2017 | |
| WO | WO 2018-152467 | | 8/2018 | |

* cited by examiner 0.16 cm/s, 1100 grams weight (3 weights, 2 cycles/min)

SELF-WETTING ADHESIVE COMPOSITION

CROSS REFERENCE TO RELATED APPLICATIONS

This application is a national stage filing under 35 U.S.C. 371 of PCT/US2018/018631, filed Feb. 19, 2018, which claims the benefit of Provisional Application No.62/623396, filed Jan. 29, 2018 and Provisional Application No. 62/461153, filed Feb. 20, 2017, the disclosure of which is incorporated by reference in its/their entirety herein.

BACKGROUND

Pressure-sensitive tapes may be used in the home and workplace. For example, the tapes can be used to attach an object to a substrate such as a smooth glass surface. Properties of the tape such as the wet out rate of the tape and the peel strength of the tape can directly affect the ability of the tapes to attach the object to the substrate.

SUMMARY

According to various embodiments of the present disclosure, a composition includes about 5 to about 40 parts by weight of a solute copolymer component. The solute component optionally has one $T_g$ or $T_m$ of at least 25° C. And in some embodiments, the solute component has one $T_g$ or $T_m$ of at least 25° C. The composition further includes about 60 to about 95 parts by weight of a solvent monomer. The solvent monomer component includes (meth)acrylate monomers and a multifunctional acrylate. In some embodiments, sum of the solute copolymer component and the solvent monomer component is 100 parts by weight. The composition further includes about 5 to about 100 parts of a plasticizer component, relative to the 100 parts of solvent monomer and solute copolymer. The plasticizer component comprises at least one plasticizer comprising an acid group.

Further embodiments are directed to a method of making a cured adhesive film including at least partially polymerizing a composition including about 60 to about 95 parts by weight of a solvent monomer component comprising (meth) acrylate monomers and a multifunctional acrylate. The composition further includes about 5 to about 40 parts by weight of a solute copolymer component optionally having one $T_g$ or $T_m$ of at least 25° C. to give an at least partially polymerized composition. The sum of the solute copolymer component and the solvent monomer component is 100 parts by weight. According to various embodiments, the partially polymerized composition can be cured to form an adhesive film.

DETAILED DESCRIPTION

Figure 1:
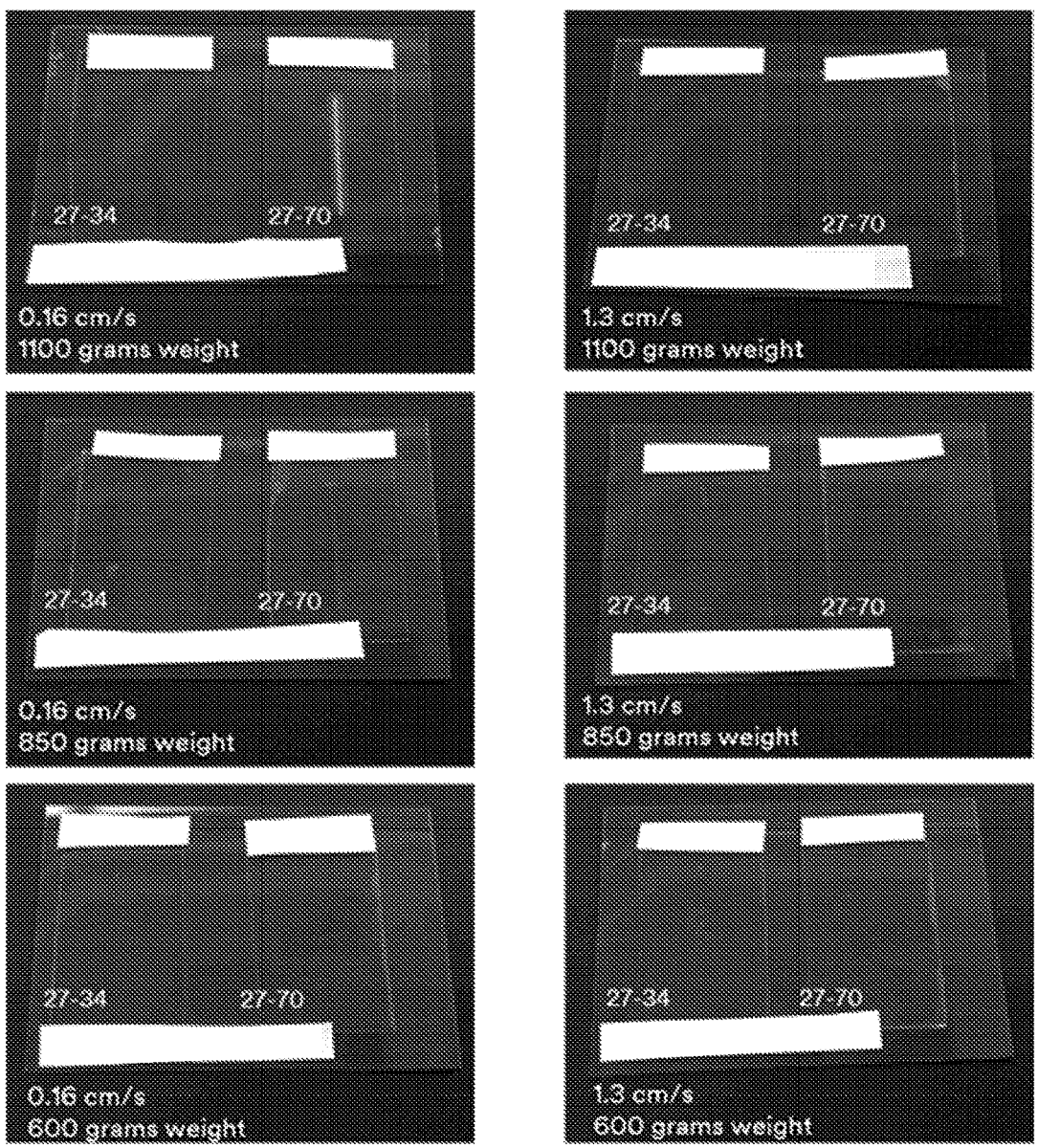
FIG. 1-8 are photographs of scratch testing, according to various embodiments of this disclosure.

The present disclosure provides novel compositions that can be cured to form an adhesive film. According to various embodiments, the adhesive film is substantially self-wetting when it is applied to a substantially smooth surface. That is, the adhesive film undergoes a substantially spontaneous wet-out with substantially no need to apply external pressure.

The composition can be cured directly or a portion of the composition can be prepolymerized to form a syrup and subsequently cured. As described further herein, the adhesive film cast from the compositions of the present disclosure can have several beneficial features compared to other films that have a high-wet out rate. For example, the adhesive film can have good peelability and demonstrate good shear hold. For example the adhesive films can remain bonded to an adherend for an amount of time ranging from 20,000 minutes to about 30,000 minutes when a force ranging from about 13.79 kPa (2 lb/in$^2$) to about 62.05 kPa (9 lb/in$^2$) is applied. The high shear holding power of these adhesive films can make them suitable for use as mounting objects on smooth surfaces such as glass, tile, or stainless steel. Many different objects can be mounted using the adhesive films. For example, decorative objects such as pictures, posters, calendars, clocks, attachment hooks can be mounted on smooth surfaces by these adhesive films. The adhesive films can also show good scratch-resistance properties.

The adhesive films of this disclosure provide the desired balance of tack, peel adhesion, and shear holding power, and further conform to the Dahlquist criteria; e.g., the modulus of the adhesive at the application temperature (e.g., at room temperature), is less, for example, than 3×10$^6$ dynes/cm$^2$ at a frequency of 1 Hz.

The adhesive films can be formed from a composition that includes a solute copolymer component, a solvent monomer component, and a plasticizer component. The solute copolymer component optionally has one $T_g$ or $T_m$ of at least 25° C. In various embodiments of the composition the $T_g$ is at least 25° C. In various embodiments of the composition the $T_m$ is at least 25° C. The solvent monomer component comprises (meth)acrylate monomers and a multifunctional acrylate. The solute copolymer can range from about 5 to about 40 parts by weight relative to the solvent monomer, or from about 10 to about 20 parts by weight relative to the solvent monomer, or from about 10 to about 15 parts by weight relative to the solvent monomer, or from about 15 to about 20 parts by weight relative to the solvent monomer. The solvent monomer can range from about 20 to about 95 parts by weight relative to the solute copolymer, or about 20 to about 60 parts by weight relative to the solute copolymer, or from about 30 to about 50 parts by weight relative to the solute copolymer, or from about 50 to about 90 parts by weight relative to the solute copolymer or from about 60 to about 95 parts by weight relative to the solute copolymer. The sum of the parts of the solute copolymer and the solvent monomer equals 100 parts by weight.

The plasticizer component can range from about 5 to about 100 parts, or about 10 to about 80 parts, about 15 to about 40 parts, about 30 to about 40 parts, or about 40 to about 70 parts relative to the solute copolymer and the solvent monomer.

The solute copolymer can be selected from a polyurethane, a polyester, a polyvinylpyrrolidone, a poly(methyl methacrylate), a poly((meth) acrylate), a poly(butyl acrylate), a polymer derived from a polyvinyl alcohol and an alkanal, a polyacrylonitrile, a polyolefin, a polyurea, a polybutadiene, a polystyrene, any copolymer thereof, and any combination thereof. The alkanal can have the structure according to formula I:

In Formula (I), $R^1$ can be selected from $(C_1-C_{20})$ hydrocarbyl. In additional embodiments $R^1$ can be $(C_1-C_{20})$alkyl. In additional embodiments, the solute copolymer component comprises a poly(vinyl butyral). In further embodiments, the solute copolymer comprises a block copolymer of poly(methyl methacrylate) and poly(n-butyl acrylate).

The solvent monomer component can be about 5 to about 95 parts by weight of low $T_g$ monomers or about 60 to about 95 parts by weight of the low $T_g$ monomers, or about or about 10 to about 50, or about 20 to about 40, or about 60 to about 90 parts by weight of the low $T_g$ monomers, The solvent monomer component can also include an acid functional monomer. The acid functional monomer can be about 0 to about 20 parts by weight of the solvent monomer, or about 0 to about 15 parts by weight of the solvent monomer, or about 0 to about 10 parts by weight of the solvent monomer. The solvent monomer can also include a non-acid functional polar monomer. The non-acid functional polar monomer can be about 0 to about 20 parts of the solvent monomer or about 0 to about 15 parts by weight of the solvent monomer, or about 0 to about 10 parts by weight of the solvent monomer. The solvent monomer can also include a multifunctional acrylate cross-linking agent. The multifunctional acrylate cross-linking agent can be about 5 to about 50 parts of the solvent monomer or about 10 to about 30 parts of the solvent monomer or about 15 to about 25 parts by weight of the solvent monomer. In total, the sum of the low $T_g$ monomers, the acid functional monomers, the non-acid functional polar monomer, and the multifunctional acrylate cross-linking agent equals 100 parts by weight of the solvent monomer.

The (meth)acrylate monomer of the solvent monomer can be a monomeric (meth)acrylic ester of a non-tertiary alcohol, which includes from 1 to 18 carbon atoms or from 4 to 12 carbon atoms. A mixture of such monomers may be used.

Examples of monomers suitable for use as the (meth)acrylate monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol; 2-hexanol, 2-methyl-1-pentanol; 3-methyl-1-pentanol, 2-ethyl-1-butanol; 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the (meth)acrylate monomer is the ester of (meth)acrylic acid with butyl alcohol or isooctyl alcohol, or a combination thereof, although combinations of two or more different (meth)acrylate ester monomers are suitable as well.

In some embodiments, the (meth)acrylate monomer is the ester of (meth)acrylic acid with an alcohol derived from a renewable source, such as 2-octanol, citronellol, dihydrocitronellol. In some embodiments a portion of the above described (meth)acrylate esters may be substituted with (meth)actylates derived from 2-alkyl alkanols.

In examples where the solvent monomer component includes the acid functional monomer, the acid functional group of the monomer may be an acid per se, such as a carboxylic acid or an ester thereof; or a portion may be salt thereof, such as an alkali metal carboxy late. Useful acid functional monomers include, but are not limited to, those selected from ethylenically unsaturated carboxylic acids, ethylenically unsaturated sulfonic acids, ethylenically unsaturated phosphonic acids, and mixtures thereof. Exemplary ethylenically unsaturated carboxylic acids may include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, and mixtures thereof. Examples of ethylenically unsaturated sulfonic acids may include: vinylsulfonic acid, 2-acrylamido-2-methylpropanesulfonic acid, 2-acryloyloxyethanesulfonic acid and 2-methacryloyloxyethanesulfonic acid, 2-acryloyloxy- and 3-methacryloyloxypropanesulfonic acid, vinylbenzenesulfonic acid, and mixtures thereof. Examples of ethylenically unsaturated phosphoric acids may include vinylphosphonic acid vinyl phosphoric acid, and mixtures thereof.

In addition to the low $T_g$ monomer and optional acid functional monomer, a copolymer made using those two components may optionally include other monomers, such as non-acid functional polar monomers as stated above, vinyl monomers and vinyl ether monomers, provided the resultant copolymer has a $T_g$ of <0° C., maintains compatibility with the plasticizer component, and has the requisite optical and adhesive properties.

Representative examples of suitable non-acid functional polar monomers include but are not limited to a hydroxyl containing monomer, an ethylenically unsaturated amine containing monomer, or a combination thereof. Additionally, the non-acid functional polar monomer may include 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethylactylamide; N-octylacrylamide; poly(alkoxyalkyl) (meth)acrylates including 2-(2-ethoxyethoxy)ethyl(meth)acrylate, 2-ethoxyethyl (meth)acrylate, 2-methoxyethoxyethyl (meth)acrylate, 2-methoxyethyl methacrylate, polyethylene glycol mono(meth)acrylates; alkyl vinyl ethers, including vinyl methyl ether; and mixtures thereof. Suitable examples of polar monomers include those selected from the group of polyethylene glycol mono(meth)acrylates, 2-hydroxyethyl (meth)acrylate and N-vinylpyrrolidinone.

A useful predictor of the $T_g$ for specific combinations of various monomers can be computed by application of the Fox Equation: $1/T_g = \Sigma T_{g,i}$. In this equation, $T_g$ is the glass transition temperature of the mixture, Wi is the weight fraction of component i in the mixture, and $T_{g,i}$ is the glass transition temperature of component i, and all glass transition temperatures are calculated in Kelvin (K). As used herein the term "low $T_g$ monomer" refers to a monomer, which when homopolymerized, produces a (meth)acrylate copolymer having a $T_g$ ranging from about −50° C. to about 0° C., or about −20° C. to about −50° C. as calculated using the Fox Equation. Alternatively, the glass transition temperature can be measured in a variety of known ways, e.g., through differential scanning calorimetry (DSC). In order to provide sufficient cohesive strength of the adhesive composition, a multifunctional (meth)acrylate is incorporated into the blend of polymerizable monomers. Examples of useful multifunctional (meth)actylate include, but are not limited to, di(meth)acrylates, tri(meth)acrylates, and tetra(meth)acrylates, such as 1,6-hexanediol di(meth)actylate, poly(ethylene glycol) di(meth)acrylates, polybutadiene di(meth)acrylate, polyurethane di(meth)acrylates, and propoxylated glycerin tri(meth)acrylate, and mixtures thereof. The amount and identity of multifunctional (meth)acrylate can be tailored depending upon application of the adhesive composition, as further exemplified below.

The composition further comprises a plasticizer component. The plasticizer component comprises at least one plasticizer that includes an acid group. That is the plasticizer includes at least one acid functional group. For example the plasticizer can include at least one functional group haying acidic hydrogen atom such as a carboxylic acid functional group or an acid anhydride group. The plasticizer(s) including the acid group can range from about 5 parts to about 100 parts by weight of the plasticizer component, about 5 parts to about 99 parts, about 10 parts to about 90 parts, about 20 parts to about 80 parts, about 30 parts to about 70 parts, or about 40 parts to about 60 parts by weight of the plasticizer component. In addition to the plasticizer including the acid group the plasticizer component can include at least one plasticizer that is free of an acid group. The plasticizer(s) that is free of an acid group can range from about 1 part to about 95 parts of the plasticizer component or from about 5 parts to about 95 parts, about 10 parts to about 90 parts, about 20 parts to about 80 parts, about 30 parts to about 70 parts, or about 40 parts to about 60 parts by weight of the plasticizer component.

The plasticizer component acts generally to increase flexibility of the cured adhesive film by internal modification (e.g., solvation) of the adhesive, film and enhances the wet out properties of the adhesive film.

The plasticizer comprising an acid group can act to the increase the polarity of the composition. In examples of the composition where the solvent monomer includes an acid functional monomer, the acid group of the acid functional monomer and the acid group of the plasticizer lead to an increased to increase the polarity of the composition in that the concentration of the acid groups is increased in the composition. The increase in polarity can help to dissolve polar solutes in the composition. For example, in examples of the composition where the solute copolymer component is poly (vinyl butyral) the plasticizer comprising the acid group can help to dissolve some forms of poly (vinyl butyral), which can require relatively high polarity in order to dissolve.

That is the adhesive film including the plasticizer comprising the acid group may be less rigid and more soft than a corresponding adhesive film that is free of the plasticizer comprising the acid group.

The plasticizer(s) included in the plasticizer component may be solid or liquid at room temperature. If solid, the plasticizer(s) can be softened. or liquefied by heating to cause the plasticizer(s) to melt. If solid, the plasticizer(s) can be a crystalline solid, displaying a measurable melting temperature when measured using Differential Scanning calorimetry (DSC). The melting temperature of solid plasticizers used in the present disclosure may be relatively low (e.g., about 10° c to about 60° C.) so as to minimize any heating that may be required. When plasticizers are used that are liquid at room temperature, heating is not required to cause the bond to form in a timely manner.

Some migration of the plasticizer from or throughout the adhesive film can be tolerated, such as minor separation due to composition equilibrium or temperature influences. However, in some examples the plasticizer does not migrate to the extent of phase separation between the cured adhesive copolymer and plasticizer.

One or more, plasticizers forming the plasticizer component are, in some embodiments, non-volatile. "Non-volatile" refers to plasticizers that do not substantially vaporize wider bond formation conditions. That is, the plasticizers generate less than 3% VOC (volatile organic content). The VOC content can be determined analogously to ASTM D 5403-93 by exposing the plasticizer compounded adhesive to 100° C. in a forced draft oven for one hour. If less than 3% of die plasticizer is lost from the compounded adhesive, then die plasticizer is considered "non-volatile."

One or more plasticizers forming the plasticizer component are, in sonic embodiments, non-reactive with other components of the adhesive, the substrate, or air. For example, the plasticizer may be inert with respect to other components in the system, including the adhesive (co) polymer and substrate. When the plasticizer is non-reactive with respect to air, loss of optical properties, such as by hazing or yellowing, may be minimized. In other examples it call be possible for the one or more plasticizers to be reactive with other components of the adhesive.

Useful plasticizers have a broad range of molecular weights and architectures. The plasticizers may be polymeric or monomeric.

Suitable examples of plasticizers comprising an acid group include capric acid, lauric acid, a fatty acid, oleic acid, citric acid, tartaric acid, malic acid, lactic acid, 2-ethyl hexanoic acid, myristic acid, phthalic acid, adipic acid, trimellitic acid, glutaric acid, hydrochloric acid, hypochthrous acid, chloric acid, sulfonic acid, benzenesulfonic acid, sulphonic acid, sulfuric acid, polysulfuric acid, peroxymonosulfuric acid, peroxydisulfuric acid, dithionic acid, thiosulfuric acid, disulfurous acid, sulfurous acid, dithionous acid, polythionic acid, thiosulfurous acid, acidic acid, phosphoric acids, phosphorous acids, phosphonic acids, and sebacic acid.

If present, classes of suitable plasticizers that are free of an acid group include those selected from esters, ethers, hydrocarbons, paraffins, sulphonamides, sulfonates, terephthalates, terpenes, and trimellitates. Common among ester-based plasticizers are esters of mono- or di-basic acids such as myristate esters, phthalate esters, adipate esters, phosphate esters, citrates, trimellitates, glutarates, and sebacate esters (e.g., dialkyl phthalates, such as dibutyl phthalate, diisoctyl phthalate, dibutyl adipate, dioctyl adipate; 2-ethylhexyl diphenyl diphosphate; t-butylphenyl diphenyl phosphate; butyl benzylphthalates; dibutoxyethoxyethyl adipate; dibutoxypropoxypropyl adipate; acetyltri-n-butyl citrate; dibutylsebacate; etc.). Phosphate ester plasticizers are commercially sold under the trade designation SANTICIZER from Monsanto; St. Louis, Mo. Glutarate plasticizers are commercially sold under the trade designation PLASTHALL 7050 from CP. Hall Co.; Chicago, Ill.

Additional examples of ester-based plasticizers include aliphatic monoalkyl esters, aromatic monoalkyl esters, aliphatic polyalkyl esters, aromatic polyalkyl esters, polyalkyl esters of aliphatic alcohols, phosphonic polyalkyl esters, aliphatic poly(alkoxylated) esters, aromatic poly(alkoxylated) esters, poly(alkoxylated) ethers of aliphatic alcohols, and poly(alkoxylated) ethers of phenols. In some embodiments the esters are derived from an alcohol or from a renewable source, such as 2-octanol, citronellol, dihydrocitronellol or from 2-alkyl alkanols.

The compositions described herein can be cured to form the adhesive film. To cure the composition it may be necessary to add additional components to the composition. For example photoinitiators may be added to aide in polymerization. Additional components such as fillers, antioxidants, stabilizers, and colorants may also be added to the composition.

Curing the composition may include treatment with UV radiation, in the presence of a photoinitiator, which will simultaneously polymerize the solvent monomers and cross-link the composition with the multifunctional acrylate.

Any suitable free radical initiator may be used to generate the initial polymerization in the composition. Examples of suitable thermal initiators include peroxides such as benzoyl peroxide, dibenzoyl peroxide, dilauryl peroxide, cyclohexane peroxide, methyl ethyl ketone peroxide, hydroperoxides, e.g., tent-butyl hydroperoxide and cumene hydroperoxide, dicyclohexyl peroxydicarbonate, 2,2,-azo-bis (isobutyronitrile), and t-butyl perbenzoate. Examples of commercially available thermal initiators include initiators available from DuPont Specialty Chemical (Wilmington, Del.) under the VAZO trade designation including VAZO™ 67 (2,2'-azo-bis(2-methybutyronitrile)) VAZO™ 64 (2,2'-azo-bis(isobutyronitrile)) and VAZO™ 52 (2,2'-azo-bis(2,2-dimethyvaleronitrile)), and LUCIDOL™ 70 from Elf Atochem North America, Philadelphia, Pa.

The solute (co)polymer(s) may be prepared conventionally in a non-monomeric solvent and advanced to high conversion (degree of polymerization, e.g., 90% to 100%). When solvent (monomeric or non-monomeric) is used, the solvent may be removed (for example by vacuum distillation) either before or after polymerization.

As described above, curing the composition can include photoinitiated free radical polymerization. Advantages of the photopolymerization method are that 1) heating the monomer solution is unnecessary and 2) photoinitiation is stopped completely when the activating, light source is turned off. Polymerization to achieve a coatable viscosity may be conducted such that the conversion of monomers to polymer ranges from about 5% to about 30%, or about 10% to about 20%. Polymerization can be terminated by removing the light source and by bubbling air (oxygen) into the solution to quench propagating free radicals.

During curing the monomer mixture is generally partially polymerized (converted) to produce the copolymer comprising about 5 to about 40 parts, or about 10 to about 30 parts, or about 30 parts to about 40 parts by weight of the solute copolymer in solvent monomers.

A viscosity of the mixture, as measured for example by a Brookfield Viscometer (Model DV2T), of from 50 cP about 3,000 cP at 22° C. when liquefied, or from about 100 cp to about 500 cP, from about 500 cP to about 1,000, from about 500 cp to about 40,000 cP, about 1,000 cP to about 20,000 cP, or about 5,000 cP to about 10,000 cP at 22° C. After partial conversion, the multifunctional acrylate, the plasticizer and optional additional monomers are added and the composition is further polymerized, by, e.g., photopolymerization using a photoinitiator.

Useful photoinitiators include benzoin ethers such as benzoin methyl ether and benzoin isopropyl ether; substituted acetophenones such as 2, 2-dimethoxyacetophenone, available as Irgacure™ 651 photoinitiator (Ciba Specialty Chemicals), or as Esacure™ KB-1 photoinitiator (Sartomer Co.; West Chester, Pa.), and dimethoxyhydroxyacetophenone; substituted α-ketols such as 2-methyl-2-hydroxy propiophenone; aromatic sulfonyl chlorides such as 2-naphthalene-sulfonyl chloride; and photoactive mimes such as 1-phenyl-1,2-propanedione-2-(O-ethoxy-carbonyl)oxime.

Other useful photoinitiators include photoactive compounds such as ketones having a basis cis-4-tert-butyl-1-benzoylcyclohexane or 2-benxoyladamantane structure that undergo a Norrish I cleavage to generate free radicals that can initiate by addition to the acrylic double bonds. Additional photoinitiator can be added to the mixture to be coated after the copolymer has been formed, e.g., photoinitiator can be added to the composition.

The composition and the photoinitiator may be irradiated with UV radiation to polymerize the monomer component(s). UV light sources can be of two types: 1) relatively low light intensity sources such as backlights which provide generally 10 mW/cm$^2$ or less (as measured in accordance with procedures approved by the United States National Institute of Standards and Technology as, for example, with a Uvimap™ UM 365 L-S radiometer manufactured by Electronic Instrumentation & Technology, Inc., in Sterling, Va.) over a wavelength range of 280 to 400 nanometers and 2) relatively high light intensity sources such as medium pressure mercury lamps which provide intensities generally greater than 10 mW/cm$^2$, for example between 15 and 450 W/cm$^2$. When actinic radiation is used to fully or partially polymerize the composition, high intensities and short exposure times may be employed. For example, an intensity of 600 W/cm$^2$ and an exposure time of about 1 second may be used successfully. Intensities can range from about 0.1 to about 150 mW/cm$^2$, or from about 0.5 to about 100 W/cm$^2$, or from about 0.5 to about 50 mW/cm$^2$. Such photoinitiators may be present in an amount of from about 0.1 to about 1.0 pbw per 100 pbw, or from about 0.3 to about 0.7 pbw per 100 pbw of the polymer composition.

It will be understood that curing can produce a "dead polymer" in the initial free radical polymerization; e.g., a fully polymerized, not free-radically polymerizable polymer. Subsequently the solvent monomers do not free-radically polymerize onto the extant solute copolymer. Upon compounding the polymer, further exposure to UV initiates free radical polymerization of the solvent monomers and multifunctional acrylate crosslinking agent to produce a distinct crosslinked copolymer. Upon curing, the product may be characterized as a homogenous mixture of a) a low $T_g$ (co)polymer (from the initial polymerization, b) a highly crosslinked low $T_g$ (co)polymer (from the subsequent polymerization of the monomer and multifunctional acrylate component and c) the plasticizer.

If desired, the composition may be coated on a substrate prior to further polymerization. Additionally, other additives such as fillers, antioxidants, stabilizers, and colorants may be blended with the adhesive for beneficial properties. In some embodiments the composition may include one or more fillers. In many embodiments the filler is of a type and used in amounts such that incorporation does not deleteriously affect the optical and adhesive properties of the adhesive. In some embodiments, small amounts of filler may be used to improve the cohesive strength of the adhesive.

Such compositions may include 1 wt %, to about 50 wt % or about 10 wt % to about 40 wt % filler, based on the total weight of the composition.

Fillers may be selected from one or more of a wide variety of materials, as known in the art, and include organic and inorganic filler. Inorganic filler particles include silica, submicron silica, zirconia, submicron zirconia, non-vitreous microparticles, nanosized silica particles, nanosized metal oxide particles, and combinations thereof.

In some embodiments, the composition comprises a nanoparticle filler having an average primary particle size ranging from about 5 nanometers to about 100 nanometers or from about 10 nanometers to about 50 nanometers. As used herein, the term "primary particle size" refers to the size of a non-associated single particle.

In some embodiments, surface modified filler can be used. The surface modifying agents for the fillers may enhance dispersibility or theological properties. Examples of surface modifying agents include silanes such as aryl polyethers, alkyl, hydroxy alkyl, hydroxy aryl, or acrylate, amino alkyl functional silanes.

In some embodiments the filler is hydrophobic fumed silica, such as Aerosil™ R972 fumed silica from Degussa.

According to some embodiments, the adhesive film can be prepared by a syrup polymerization technique that include prepolymerizng part of the composition. As used herein "syrup polymer composition" refers to a solution of a solute (co)polymer in one or more solvent monomers, the composition can have a viscosity of from 50 cP about 40,000 cP when liquefied., Here, a monomer mixture comprising the (meth) acrylate monomer, the optional acid functional monomer and other monomers are combined and partially polymerized using a thermal- or photoinitiator. The resulting syrup polymer, comprising a solute (meth)acrylate copolymer and unreacted solvent monomers, is then combined with the multifunctional acrylate crosslinking agent and photoinitiator. If desired, additional solvent monomers and initiators may be added after the initial partial polymerization. The additional monomers charged may be the same or different than the initial monomer charge.

The cured compositions form adhesive films that have several useful features. Examples of such features are described below.

The adhesive films cast from compositions of the present disclosure exhibit great conformability permitting them to spontaneously wet out on substrates such as glass or any other hard and smooth surface. Thus the adhesive films may be referred to as self-wetting. By "self-wetting" it is meant that the adhesive film exhibits spontaneous wetting out on a smooth surface to which it is applied with little or no external pressure. In some embodiments a wet-out rate of the adhesive film ranges from about 7.7 s/dn$^2$ (0.5 s/in$^2$) to about 775.0 s/in$^2$ (50 s/in$^2$), or from about 418.5 s/in$^2$ (27 s/in$^2$) to about 620.0 s/in$^2$ (40 s/in$^2$), or from about 7.7 s/in$^2$ (0.5 s/in$^2$) to about 155.0 s/in$^2$ (10 s/in$^2$). In some embodiments the wet-out rate of the adhesive film cast from a composition having a plasticizer comprising an acid group is faster than a corresponding adhesive film that is free of the plasticizer comprising an acid group.

The surface characteristics of the films also permit an adhesive film to be bonded and removed from the substrate repeatedly for repositioning or reworking. The strong cohesive strength of the adhesive film gives them structural integrity limiting cold flow and giving elevated temperature resistance in addition to permanent removability. In some embodiments the initial removability of the adhesive film bonded to a glass substrate, as measured by the 180° Peel Adhesion test ranges from about 0.5 Newtons/decimeter to about 5 Newtons/decimeter. In some examples, the plasticizer comprising an acid functional group leaves substantially no residue on the substrate following removal of the adhesive film as determined thorough optical inspection.

In various embodiments an adhesive film cast from compositions of the present disclosure is scratch resistant when subjected to a linear stroke of a stylus of having a speed ranging from about 0.16 cm/s to about 0.5 cm/s and where a weight applied to the stylus ranging from about 0 grains to about 1500 grams. Without intending to be bound to any specific theories, the inventors believe that the solute copolymer increases the scratch resistance of the adhesive film. Therefore, the adhesive film is more scratch resistant than a corresponding adhesive film that is substantially free of the solute copolymer component. In addition, a 0.5 inch wide by 0.5 inch long sample of the adhesive film remains adhered to a substrate for a time ranging from approximately 10 minutes to 40 days when a force ranging from about 2 lbs/in$^2$ to about 10 lbs/in$^2$ is applied to the adhesive film. Without intending to be bound to any theories the inventors believe that the solute copolymer increases adherence of the adhesive film. Therefore adhesive film that include the solute copolymer remain adhered to the substrate for a substantially longer period of time than a corresponding adhesive film that is substantially free of the solute copolymer component. The adhesive films formed from the cured compositions can have many different applications. For example, adhesive articles may include the adhesive film and be prepared by forming the adhesive film on a suitable support, such as a flexible backing. The adhesive film can be formed by coating the support with the composition and curing the composition thereon. Examples of materials that can be included in the flexible backing include polyolefins such as polyethylene, polypropylene (including isotactic polypropylene), polystyrene, polyester, polyvinyl alcohol, poly(ethylene terephthalate), poly(butylene terephthalate), poly (caprolactam), poly(vinylidene fluoride), polylactides, cellulose acetate, and ethyl cellulose and the like. Commercially available hacking materials useful in the invention include kraft paper (available from Monadnock Paper, Inc.); cellophane (available from Flexel Corp.); and porous films obtained from poly(ethylene) and poly(propylene), such as Teslin™ (available from PPG Industries, Inc.), and Cellguard™ (available from Hoechst-Celanese).

The adhesive film may also be formed on microstructured surfaces. Microstructured surfaces can be made in various ways, including, e.g., using micro-replication techniques, laser ablation or embossing. In some embodiments of this disclosure, a microstructured resin layer is provided on a polymeric film substrate such as a polyethylene terephthalate (PET) or polycarbonate film. A microreplication tool can be fabricated using diamond turning methods such as those described, for example, in PCT Published Application No. WO 00/48037 (Campbell et al.), and U.S. Pat. No. 7,350,442 (Elwes et al.) and U.S. Pat. No. 7,328,638 (Gardiner et al.). The tool can be used in a cast-and-cure process as described, for example, in U.S. Pat. No. 5,175,030 (Lu et al.) and U.S. Pat. No. 5,183,597 (Lu), to produce microstructures such as sinusoidal structures on a substrate film. In some embodiments, an acrylate resin is used to form the structures. The backing may also be formed of metal, metalized polymer films, or ceramic sheet materials, The adhesive articles herein that may take the form of any article conventionally known to be utilized with pressure sensitive adhesive compositions such as labels, tapes, signs, covers, marking indicia, and the like.

The above-described adhesive films can be formed, in part, on a substrate by depositing the composition thereon using conventional coating techniques, which can be modified as appropriate to the particular substrate. For example, the composition can be applied to a variety of solid substrates by methods such as roller coating, flow coating, dip coating, spin coating, spray coating, knife coating, and die coating. These various methods of coating allow the compositions to be placed on the substrate at variable thicknesses thus allowing a wider range of use of the compositions. Coating thicknesses may vary, but coating thicknesses of 2-500 microns (dry thickness), or in some embodiments about 10 to 250 microns, are contemplated.

In some embodiments, the composition, e.g., the solute (co)polymer, unreacted monomers, multifunctional acrylate crosslinking agent and plasticizer is coated on a backing or release liner, and then further polymerized.

The substrate is selected depending on the particular application in which it is to be used. For example, the adhesive can be applied to sheeting products, (e.g., decorative graphics and reflective products), label stock, and tape backings. Additionally, the adhesive may be applied directly onto a substrate such as an automotive panel, a glass window, a computer screen or the screen of a hand-held device or onto a substrate such as an automotive panel, a glass window, a computer screen or the screen of a hand-held device, or other smooth surfaces such as a kitchen or bathroom surface; so that another substrate or object can be attached to substrate.

The adhesive film can also be provided in the form of an adhesive transfer tape in which at least one layer of the adhesive film is disposed on a release liner for application to a permanent substrate at a later time. The adhesive film can also be provided as a single coated or double coated tape in which the adhesive is disposed on one or both opposing sides of a permanent backing.

Examples of adhesive articles in which the self-wetting and removability features of the adhesive film that may be important include, for example: large format articles such as graphic articles and protective films; and information display devices.

Large-format graphic articles or protective films typically include a thin polymeric film backed by an adhesive. These articles may be difficult to handle and apply onto a surface of a substrate. The large format article may be applied onto the surface of a substrate by what is sometimes called a "wet" application process. The wet application process involves spraying a liquid, typically a water/surfactant solution, onto the adhesive side of the large format article, and optionally onto the substrate surface. The liquid temporarily "detackifies" the adhesive so the installer may handle, slide, and re-position the large format article into a desired position on the substrate surface. The liquid also allows the installer to pull the large format article apart if it sticks to itself or prematurely adheres to the surface of the substrate. Applying a liquid to the adhesive may also improve the appearance of the installed large format article by providing a smooth, bubble free appearance with good adhesion build on the surface of the substrate.

Examples of a large format protective films include window films such as solar control films, shatter protection films, decoration films and the like. In some instances the adhesive film may be a multilayer adhesive film such as a multilayer IR film (e.g., an infrared reflecting film), such as a microlayer film having selective transmissivity such as an optically clear but infrared reflecting film.

While the wet application process has been used successfully in many instances, it can be a time consuming and difficult process. In other applications, such as information display devices, the wet application process cannot be used, but the adhesive films can still be applied. The adhesive films can advantageously be applied through a dry installation process. A "dry" application process is generally desirable for installing large format graphic articles and other information display devices. Examples of information display devices include devices with a wide range of display area configurations including liquid crystal displays, plasma displays, organic light emitting diode (OLED) displays, front and rear projection displays, cathode ray tubes and signage. Such display area configurations can be employed in a variety of portable and non-portable information display devices including personal digital assistants, cell phones, touch-sensitive screens, wrist watches, car navigation systems, global positioning systems, depth finders, calculators, electronic books, CD or DVD players, projection television screens, computer monitors, notebook computer displays, instrument gauges, instrument panel covers, signage such as graphic displays (including indoor and outdoor graphics, bumper stickers, etc.) reflective sheeting, virtual reality (VR) devices, augmented reality (AR) devices and the like. Thus using the adhesive film, articles can be more easily attached to a large substrate because they are self-wetting and yet they may be easily removed and repositioned as needed.

A wide variety of information display devices are in use, both illuminated devices and non-illuminated devices. Many of these devices utilize adhesive articles, such as adhesive coated films, as part of their construction. One adhesive article frequently used in information display devices is a protective film. Such adhesive films are frequently used on information display devices that are frequently handled or have exposed viewing surfaces.

In some embodiments, the adhesive films of this disclosure may be used to attach such films to information display devices or incorporated into information display devices because the adhesive films have the properties of optical clarity (e.g., less than about 5% haze or less than about 2% haze), self-wetting and removability. The adhesive property of optical clarity permits the information to be viewed through the adhesive film without interference. The features of self-wetting and removability permit the adhesive film to be easily applied to the front surface of a display, removed and reworked if needed during assembly and also removed and replaced during the working life of the information display device. The adhesive film of the disclosure may have a thickness greater than about 0.03 millimeters, generally an average birefringence (absolute) of less than $1 \times 10^{-6}$, average light transmission ranging from about 85% to about 100%, or from about 90% to about 95% and a CIELAB b* ranging from about 0.5 units to about 1.5 units, or about 0.5 units to about 1.0 unit for samples with adhesive thickness of about 500 microns, Further, the adhesive layer of these articles may have optical properties at least equal to those of the composite article so the articles appear transparent.

In some embodiments this disclosure provides solar control articles, e.g., films including the adhesive film that may be applied to windows to selectively reduce the transmissivity over the spectral region of interest including UV, visible and IR. The solar control articles comprise a solar control film and a layer of an adhesive of this disclosure on a major surface thereof. Some known solar control films desirably have transmissivity on at least 80% in the visible range (400-700 nm), and reduced transmissivity of less than 80%, less than 70%, or less than 60% in the IR (700-2000 nm) and/or UV (100 to 400 nm) ranges. Solar control films include dyed or pigmented and vacuum-coated polymeric films that reduce the transmissivity of various spectral regions from the incident light, e,g, sunlight. To reduce heat load from incident light, solar transmission is blocked in either the visible or the infrared portions of the solar spectrum (e.g, at wavelengths ranging from 400 nm to 2500 nm or greater) Primarily through absorption, dyed films can control the transmission of visible light and consequently provides glare reduction. However, dyed films generally do not block near-infrared solar energy and consequently are not completely effective as other solar control films. Other window films are fabricated using vacuum-deposited grey metals, such as stainless steel, inconel, monel, chrome, or nichrome alloys. The deposited grey metal films offer about the same degrees of transmission in the visible and infrared portions of the solar spectrum. The grey metal films are relatively stable when exposed to light, oxygen, and/or moisture, and in those cases in which the transmission of the coatings increases due to oxidation, color changes are generally not detectable. After application to clear glass, grey metals block light transmission by approximately equal amounts of solar reflection and absorption. Vacuum-deposited layers such as silver, aluminum, and copper control solar radiation primarily by reflection and are useful only in a limited number of applications due to the high level of visible reflectance. A modest degree of selectivity (e.g., higher visible transmission than infrared transmission) is afforded by certain reflective materials, such as copper and silver. The metal deposited films may also have air- and water-vapor barrier properties. Additionally, solar control films based on multilayer optical films (MLOF) have been developed which, in some embodiments, comprise hundreds or even thousands of film layers and optional nanoparticles, and which selectively transmit or reflect based on small differences in the refractive indices of adjacent film layers and reflectance or absorbance of the nanoparticles. The film layers have different refractive index characteristics so that some light is reflected at interfaces between adjacent layers. The layers are sufficiently thin so that light reflected at a plurality of the interfaces undergoes constructive or destructive interference in order to give the film the desired reflective or transmissive properties. For optical films designed to reflect light at ultraviolet, visible, or near-infrared wavelengths, each layer generally has an optical thickness (e.g., a physical thickness multiplied by refractive index) of less than about 1 micrometer. Thicker layers can, however, also be included, such as skin layers at the outer surfaces of the film, or protective boundary layers disposed within the film that separate packets of layers.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "of" unless otherwise indicated. The statement "at least one of A and B" has the same meaning as "A, B, or A and B." in addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term amine as used herein refers to a substituent of the form —$NH_2$, —NHR, —$NR_2$, —$NR_3^+$, wherein each R is independently selected, and protonated forms of each, except for —$NR_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The term "hydrocarbon" or "hydrocarbyl" as used herein refers to a molecule or functional group that includes carbon and hydrogen atoms. The term can also refer to a molecule or functional group that normally includes both carbon and hydrogen atoms but wherein all the hydrogen atoms are substituted with other functional groups.

The term "room temperature" as used herein refers to a temperature of about 15° C. to 28° C.

EXAMPLES

Materials

TABLE 1

Materials Table

| Designation | Description |
|---|---|
| EHA | 2-Ethylhexyl acrylate, available from BASF, Florham Park, NJ. |
| IBOA | Isobornyl acrylate, available from San Esters, New York, NY. |
| AA | Acrylic acid, available from BASF, Florham Park, NJ. |
| HEA | 2-Hydroxyl ethyl acrylate, available from BASF, Florham Park, NJ. |
| CN965 | An aliphatic polyester based urethane diacrylate oligomer available under the trade designation CN965 from Sartomer Americas, Exton, PA. |
| Irg 651 | 2,2-Dimethoxy-1,2-diphenylethan-1-one, available under the trade designation IRGACURE 651 from BASF Corporation, Vandalia, IL. |

TABLE 1-continued

Materials Table

| Designation | Description |
|---|---|
| PVB | Poly(vinyl butyral) having a glass transition temperature (Tg) of 70° C., available under the trade designation MOWITAL B60H from Kuraray, Houston, TX. |
| LA410 | Block copolymer of poly(methyl methacrylate) and poly(n-butyl acrylate), available under the trade designation KURARITY 410L from Kuraray Co., Ltd, Houston, TX. |
| EHAc | 2-ethyl hexanoic acid, available from Sigma Aldrich, St. Louis, MO. |
| EHOAc | 2-ethyl hexyl acetate, available from Eastman Chemical Company, Kingsport, TN. |
| HA | Hexanoic acid, available from Sigma Aldrich, St. Louis, MO. |
| H9010 | HALLGREEN 9010, a renewable ester plasticizer available from Hallstar, Chicago, IL. |
| PET1 | A silicone release liner having a nominal thickness of 51 micrometers (0.002 inches), obtained from Dupont Teijin, Dupont Chemical Company, Wilmington DE. |
| PET2 | A corona treated and chemically primed PET film having a nominal thickness of 76 micrometers (0.003 inches), obtained from 3M Company, St. Paul, MN. |

Composition Formulations

TABLE 2

Composition Formulations

| Example # | EHA | HEA | IBOA | AA | CN965 | EHAc | 2EHOAc | PVB | LA410 | HA | H9010 |
|---|---|---|---|---|---|---|---|---|---|---|---|
| 1 | 42 | 7 | 10.5 | — | 10.5 | 15 | — | 15 | — | — | — |
| 2 | 39 | 6.5 | 9.75 | 5 | 9.75 | 15 | — | 15 | — | — | — |
| 3 | 42 | 7 | 10.5 | — | 10.5 | 15 | — | — | 15 | — | — |
| 4 | 37 | 7 | 10.5 | 5 | 10.5 | 15 | — | — | 15 | — | — |
| 5 | 33 | 5.5 | 8.25 | — | 8.25 | 30 | — | 15 | — | — | — |
| 6 | 24 | 4 | 6 | — | 6 | 45 | — | 15 | — | — | — |
| 7 | 33 | 5.5 | 8.25 | — | 8.25 | 30 | — | — | 15 | — | — |
| 8 | 24 | 4 | 6 | — | 6 | 45 | — | — | 15 | — | — |
| 9 | 45 | 7.5 | 11.25 | — | 11.25 | 15 | — | 10 | — | — | — |
| 10 | 36 | 6 | 9 | — | 9 | 30 | — | 10 | — | — | — |
| 11 | 27 | 4.5 | 6.75 | — | 6.75 | 45 | — | 10 | — | — | — |
| 12 | 42 | 7 | 10.5 | — | 10.5 | 15 | — | 15 | — | — | — |
| 13 | 33 | 5.5 | 8.25 | — | 8.25 | 30 | — | 15 | — | — | — |
| 14 | 24 | 4 | 6 | — | 6 | 45 | — | 15 | — | — | — |
| 15 | 39 | 6.5 | 9.75 | — | 9.75 | 15 | — | 20 | — | — | — |
| 19 | 30 | 5 | 7.5 | — | 7.5 | 30 | — | 20 | — | — | — |
| 17 | 21 | 3.5 | 5.25 | — | 5.25 | 45 | — | 20 | — | — | — |
| 18 | 50 | 5 | 8 | — | 8 | — | — | 14 | — | 15 | — |
| 19 | 35 | 5 | 8 | — | 8 | — | — | 14 | — | 30 | — |
| 20 | 20 | 5 | 8 | — | 8 | — | — | 14 | — | 45 | — |
| C1 | 39 | 6.5 | 9.75 | 5 | 9.75 | — | 15 | 15 | — | — | — |
| C2 | 37 | 7 | 10.5 | 5 | 10.5 | — | 15 | — | 15 | — | — |
| C3 | 42 | 7 | 10.5 | — | 10.5 | — | 15 | — | 15 | — | — |
| C4 | 30 | 5 | 7.5 | 5 | 7.5 | — | 30 | 15 | — | — | — |
| C5 | 21 | 3.5 | 5.25 | 5 | 5.25 | — | 45 | 15 | — | — | — |
| C6 | 33 | 5.5 | 8.25 | — | 8.25 | — | 30 | — | 15 | — | — |
| C7 | 24 | 4 | 6 | — | 6 | — | 45 | — | 15 | — | — |
| C8 | 45.9 | 7.6 | 11.5 | 5.9 | 11.5 | — | — | 17.6 | — | — | — |
| C9 | 49.4 | 8.2 | 12.4 | — | 12.4 | — | — | — | 17.6 | — | — |
| C10 | 48 | 8 | 12 | 10 | 12 | — | — | 10 | — | — | — |
| C11 | 45 | 7.6 | 11.12 | 10 | 11.12 | — | — | 15 | — | — | — |
| C12 | 42 | 7 | 10.5 | 10 | 10.5 | — | — | 20 | — | — | — |
| C13 | 39 | 6.5 | 9.75 | 5 | 9.75 | — | — | 15 | — | — | 15 |
| C14 | 51 | 8.5 | 12.75 | — | 12.75 | 15 | — | — | — | — | — |
| C15 | — | 7 | 10.5 | — | 10.5 | 30 | — | — | — | — | — |
| C16 | — | 5.5 | 8.25 | — | 8.25 | 45 | — | — | — | — | — |
| C17 | 42 | 7 | 10.5 | — | 10.5 | 15 | — | 15 | — | — | — |

Preparation of the Compositions for UV-curing

Syrups were prepared by mixing the components in the amounts shown in Table 2 below as follows. For samples which contain PVB, the acrylic monomers, crosslinker, plasticizer, PVB and photoinitiator were combined in a MAX100 speedmix cup, and mixed using a centrifugal resin mixer (Max 100 mixing cup and FlackTek SPEEDMIXER DAC 150 FV; both from FlackTek Incorporated, Landrum, S.C.) at 3000 rpm for 5 minutes to provide a homogeneous mixture.

For samples which contained LA410, all the components were combined in the mixing cup, and then the solution was allowed to roll overnight to dissolve the polymer in the acrylic monomers.

For samples which contain no polymer add, the EHA polymer syrup was prepared first by charging a one quart (0.95 liters) jar with 400 grams of EHA and 0.16 grams of Irg 651, and stirred until the photoinitiator had dissolved and a homogeneous mixture was obtained. The mixture was degassed by introducing nitrogen gas into it through a tube inserted through an opening in the jar's cap and bubbling vigorously for at least 5 minutes. While stirring, the mixture was exposed to UV-A light until a pre-adhesive syrup having a viscosity deemed suitable for coating was formed. Following UV exposure, air was introduced into the jar. The light source was an array of LEDs having a peak emission wavelength of 365 nm. Then all components for the sample, including the EHA polymer syrup were combined in a MAX100 speedmix cup and mixed using a centrifugal resin mixer at 3000 rpm for 2 minutes to provide a homogeneous solution.

Coating of Self-Wetting Adhesives

Self-wetting adhesive syrups were coated between PET1 and PET2 using a two-roll coater having a gap setting of 0.002 inches (51 micrometers) greater than that combined thickness of the two liners, and exposed to a total UV-A energy of approximately 1824 milliJoules/square centimeter using a plurality of fluorescent bulbs having a peak emission wavelength of 350 nanometers. The total UV-A energy was determined using a POWER PUCK II radiometer equipped with low power sensing head (available from EIT Incorporated, Sterling, Va.) at a web speed of 4.6 meters/minute (15 feet/minute). The radiometer web speed and energy were then used to calculate the total exposure energy at the web speed using during curing of the acrylic composition. Unless otherwise indicated, the PET1 release liner was subsequently removed to provide a self-wetting adhesive tape for testing according to the test methods described below.

Test Methods

Wet Out Test

A glass slide with dimensions of 3 inch×1 inch was held at an angle of 69° and dropped on the self-wetting adhesive surface. The time to wet out the glass slide was recorded in seconds and divided by the area wet out (e.g., 3 in$^2$ for the glass slide). The test was performed three times for each sample, and the average was reported as shown in Table 3.

180° Peel Adhesion Test (Peel)

A test sample was prepared by placing a 0.5 (12.2 cm) inch wide by 7 inch (178 cm) long self-wetting adhesive coated tape on a 100 cm by 250 cm glass. The plates were cleaned by wiping with isopropanol before testing. The tape was rolled down onto the panel with two passes of a 2 kg roller. The test was conducted on a slip/peel tester (Instrumentors Inc.; Strongsville, Ohio). The tape was removed from the plate at a peel angle of 180° and a platen speed of 12 inches per minute (305 mm/min) for a total of 5 seconds. The force required to remove the tape was measured in grams per 0.5 inch and converted to grams per inch (g/in). All testing was carried out at CTH conditions of 23° C. and 50% relative humidity (RH). Prior to testing, samples were conditioned for a 10 minute dwell time on the glass substrate at CTH conditions, a 7 day dwell time on the glass substrate at CTH conditions, and a 7 day dwell time on the glass substrate at 65° C. (in an oven, no humidity control). Results are the average of three tests for each adhesive. The results are shown in Table 3, reported as both grams per inch (g/in) and Newtons per decimeter (N/dm). In Table 3, NT means that the sample was not tested.

TABLE 3

Wet out and Peel Adhesion Test Results

| | | Peel (g/in) | | | Peel (N/dm) | | |
|---|---|---|---|---|---|---|---|
| Example # | Wet Out (s/in$^2$) | 10 minute dwell, CTH | 7 day dwell, CTH | 7 day dwell, 65 C. | 10 minute dwell, CTH | 7 day dwell, CTH | 7 day dwell, 65 C. |
| 1 | 5.77 | 42 | 50.2 | 307.6 | 0.6 | 1.9 | 11.9 |
| 2 | 9.61 | 73.8 | 138.5 | 1417 | 2.8 | 5.3 | 54.7 |
| 3 | 1.98 | 13.4 | 21.02 | 67.9 | 0.5 | 0.8 | 2.6 |
| 4 | 3.24 | 48.9 | 73.1 | 453.9 | 1.9 | 2.8 | 17.5 |
| 5 | 1.53 | 0.1 | 0.7 | 2.3 | 0.0 | 0.0 | 0.1 |
| 6 | 0.9 | 0 | 0.4 | 1.2 | 0.0 | 0.0 | 0.0 |
| 7 | 0.8 | 0.1 | 0.6 | 2.1 | 0.0 | 0.0 | 0.1 |
| 8 | 0.62 | 0.03 | 0.2 | 1.6 | 0.0 | 0.0 | 0.1 |
| 9 | NT | 0.5 | 0.5 | 2.6 | 0.0 | 0.0 | 0.1 |
| 10 | NT | 0.1 | 0.07 | 1.1 | 0.0 | 0.0 | 0.0 |
| 11 | NT | 0.09 | 0.1 | 0.7 | 0.0 | 0.0 | 0.0 |
| 12 | NT | 0.5 | 0.6 | 3.2 | 0.0 | 0.0 | 0.1 |
| 13 | NT | 0.1 | 0.1 | 1.6 | 0.0 | 0.0 | 0.1 |
| 14 | NT | 0.1 | 0.06 | 0.8 | 0.0 | 0.0 | 0.0 |
| 15 | NT | 1.2 | 1.2 | 4.5 | 0.0 | 0.0 | 0.2 |
| 19 | NT | 0.1 | 0.08 | 1.8 | 0.0 | 0.0 | 0.1 |
| 17 | NT | 0.09 | 0.05 | 0.7 | 0.0 | 0.0 | 0.0 |
| 18 | 3.9 | 23.7 | 43.5 | NT | 0.9 | 1.7 | NT |
| 19 | 1.1 | 2.4 | 10.1 | NT | 0.1 | 0.4 | NT |
| 20 | 0.5 | 2.5 | 11.9 | NT | 0.1 | 0.5 | NT |
| C1 | 8.15 | 83.3 | 165.7 | 1337.2 | 3.2 | 6.4 | 51.6 |
| C2 | 3.81 | 17.7 | 45.6 | 191.5 | 0.7 | 1.8 | 7.4 |
| C3 | 2.19 | 7.7 | 12.03 | 54.9 | 0.3 | 0.5 | 2.1 |
| C4 | 2.34 | 0.9 | 1.5 | 17.2 | 0.0 | 0.1 | 0.7 |
| C5 | 1.69 | 1.2 | 2 | 32.3 | 0.0 | 0.1 | 1.2 |
| C6 | 0.68 | 0.01 | 0.5 | 1.7 | 0.0 | 0.0 | 0.1 |
| C7 | 0.33 | 0 | 0.1 | 1.4 | 0.0 | 0.0 | 0.1 |

TABLE 3-continued

Wet out and Peel Adhesion Test Results

| | | Peel (g/in) | | | Peel (N/dm) | | |
|---|---|---|---|---|---|---|---|
| Example # | Wet Out (s/in²) | 10 minute dwell, CTH | 7 day dwell, CTH | 7 day dwell, 65 C. | 10 minute dwell, CTH | 7 day dwell, CTH | 7 day dwell, 65 C. |
| C8 | 23.2 | 2.8 | 28.3 | 45.8 | 0.1 | 1.1 | 1.8 |
| C9 | 10.8 | 2.5 | 3.6 | 3.9 | 0.1 | 0.1 | 0.2 |
| C10 | NT | 80.1 | 76.5 | Couldn't Peel | 3.1 | 3.0 | Couldn't Peel |
| C11 | NT | 11.8 | 22.2 | Couldn't Peel | 0.5 | 0.9 | Couldn't Peel |
| C12 | NT | 2.02 | 11.5 | Couldn't Peel | 0.1 | 0.4 | Couldn't Peel |
| C13 | 0.9 | −0.9 | NT | NT | −0.3 | NT | NT |
| C14 | 1.8 | 8 | NT | NT | 308 | NT | NT |
| C15 | 0.8 | 5 | NT | NT | 1.93 | NT | NT |
| C16 | 0.5 | 4 | NT | NT | 1.54 | NT | NT |
| C17 | 1.7 | 12.6 | NT | NT | 4.86 | NT | NT |

Scratch Resistance Test

Scratch resistance tests were performed using a TABER Linear Abraser Model 5750 (Taber Industries, North Tonawanda, N.Y.) with a polypropylene stylus attachment. The instrument has a free-floating horizontal arm that moves back and forth in a linear motion, and a vertical spline shaft is attached to the horizontal arm to allow weight to be added to the shaft. For each experiment, the samples were cut into approximately 1.5 inch by 1 inch strips. The PET1 silicone release liner was peeled off and the adhesive/backing was mounted onto glass slides with a roller. The test specimen was affixed to the bottom of the spline shaft so that the stylus attachment was touching the backing. Tests were performed where the shaft was mounted with a no weight disc, 1 weight disc, 2 weight discs, and 3 weight discs, corresponding to subjecting the specimen to 350 grams, 600 grams, 850 grams, and 1100 grams of weight, respectively. Each specimen was subjected to one linear stroke (half of a cycle) of scratching, at a speed of either 0.16 cm/s or 1.3 cm/s of horizontal abraser arm movement. A fresh sample was used for each speed and weight combination.

Results of the scratch resistance tests are shown in FIGS. 1-8. FIG. 1 shows photographs of scratch testing with the TABER Abraser for samples 1 and C14, which contains the same plasticizer loading (15%). At lower speed and higher weights (0.16 cm/s, 1100 grams; 1.3 cm/s, 1100 grams; 0.16 cm/s, 850 grams), the stylus impacted visible damage to the adhesive layer of C14, the sample containing no PVB. In contrast, Sample 1 containing PVB is able to withstand the scratch test. In these images, the samples are still laminated to the glass substrate, so the backing side is facing the camera.

Figure 2:
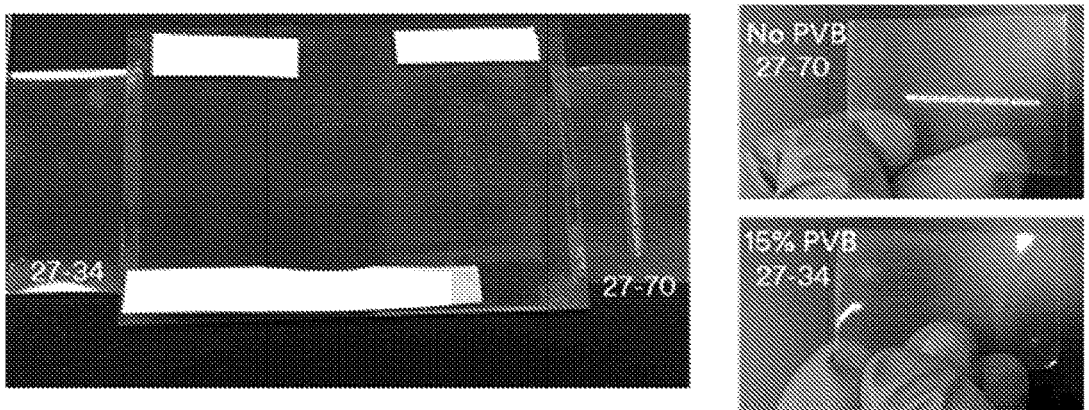

FIG. 2: shows photographs of scratch testing with the TABER Abraser for samples 1 and C14. In these images, the samples have been removed from the glass substrate and turned over, so the adhesive side is facing the camera. The stylus imparted permanent damage to the sample with no PVB (C14), with clearly observable scratch marks and leaving residue on the glass substrate. In contrast, sample containing 15% PVB (1) at did not show permanent damage and did not leave residue.

Figure 3:

FIG. 3 shows photographs of scratch testing with the TABER Abraser for samples 5 and C15, which contains the same plasticizer loading (30%). While at high weights and lower speed (0.16 cm/s, 850 grams) both samples showed visible damage, samples with PVB (5) showed comparatively less damage at lower weights and higher speeds. At 0 weight disc (250 grams), the stylus impacted visible damage to the adhesive layer of C15, the sample containing no PVB.

In contrast, Sample 5 containing PVB is able to withstand the scratch test. In these images, the samples are still laminated to the glass substrate, so the backing side is facing the camera.

Figure 4:
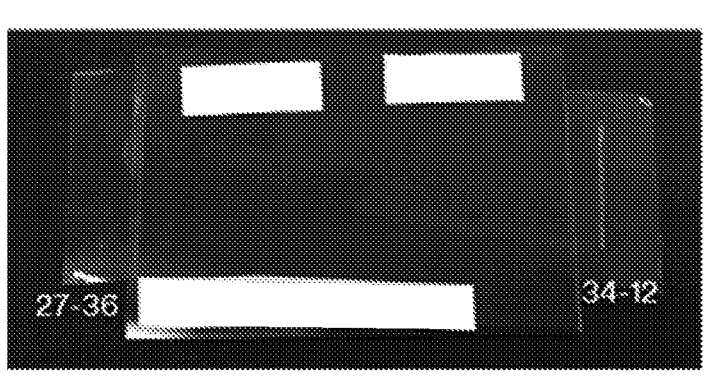
Figure 4:
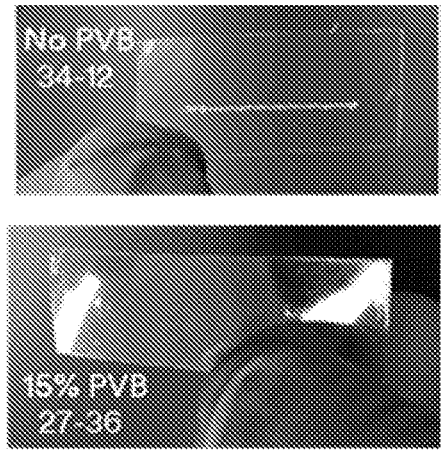
Figure 4:
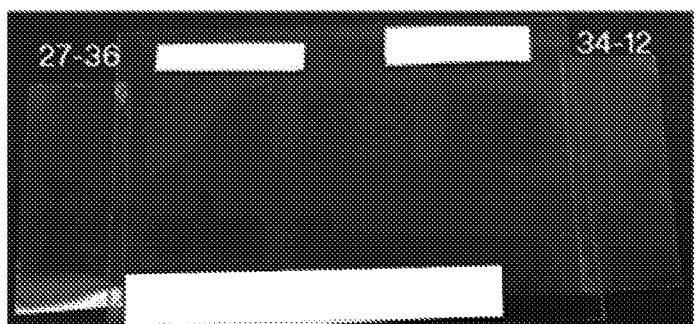
Figure 4:
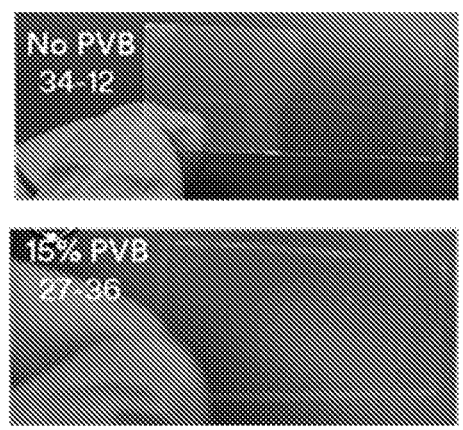
Figure 5:

FIG. 4 shows photographs of scratch testing with the TABER Abraser for samples 5 and C15. In these images, the samples have been removed from the glass substrate and turned over, so the adhesive side is facing the camera. The stylus imparted permanent damage to samples with no PVB (C15), while samples containing 15% PVB (5) at did not show permanent damage. FIG. 5 shows photographs of scratch testing with the TABER Abraser for samples 6 and C16, which contains the same plasticizer loading (45%). While at high weights and lower speed (0.16 cm/s, 850 grams) both samples showed visible damage, samples with PVB (6) showed comparatively less damage at lower weights and higher speeds. At 0 weight disc (250 grams), the stylus impacted visible damage to the adhesive layer of C16, the sample containing no PVB. In contrast, Sample 6 containing PVB is able to withstand the scratch test. In these images, the samples are still laminated to the glass substrate, so the backing side is facing the camera.

Figure 6:
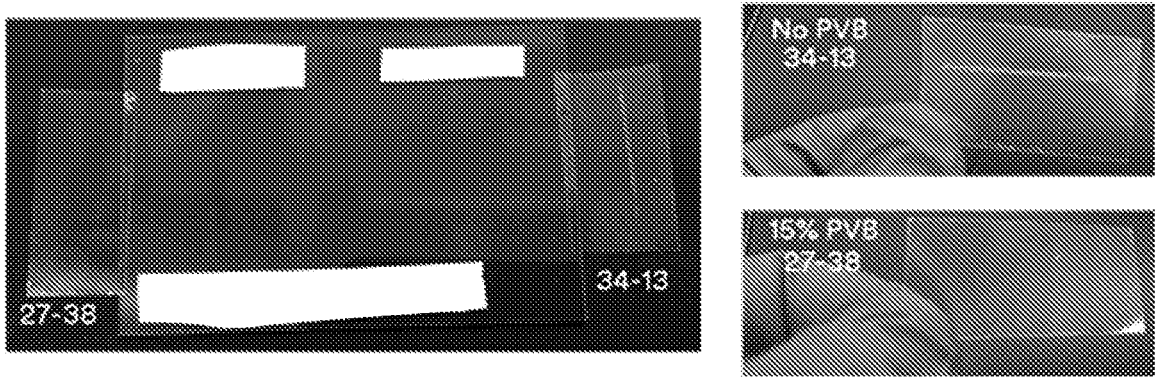

FIG. 6 shows photographs of scratch testing with the TaABER Abraser for samples 6 and C16. In these images, the samples have been removed from the glass substrate and turned over, so the adhesive side is facing the camera. The stylus imparted permanent damage to samples with no PVB (C16), while samples containing 15% PVB (6) at did not show permanent damage.

Figure 7:
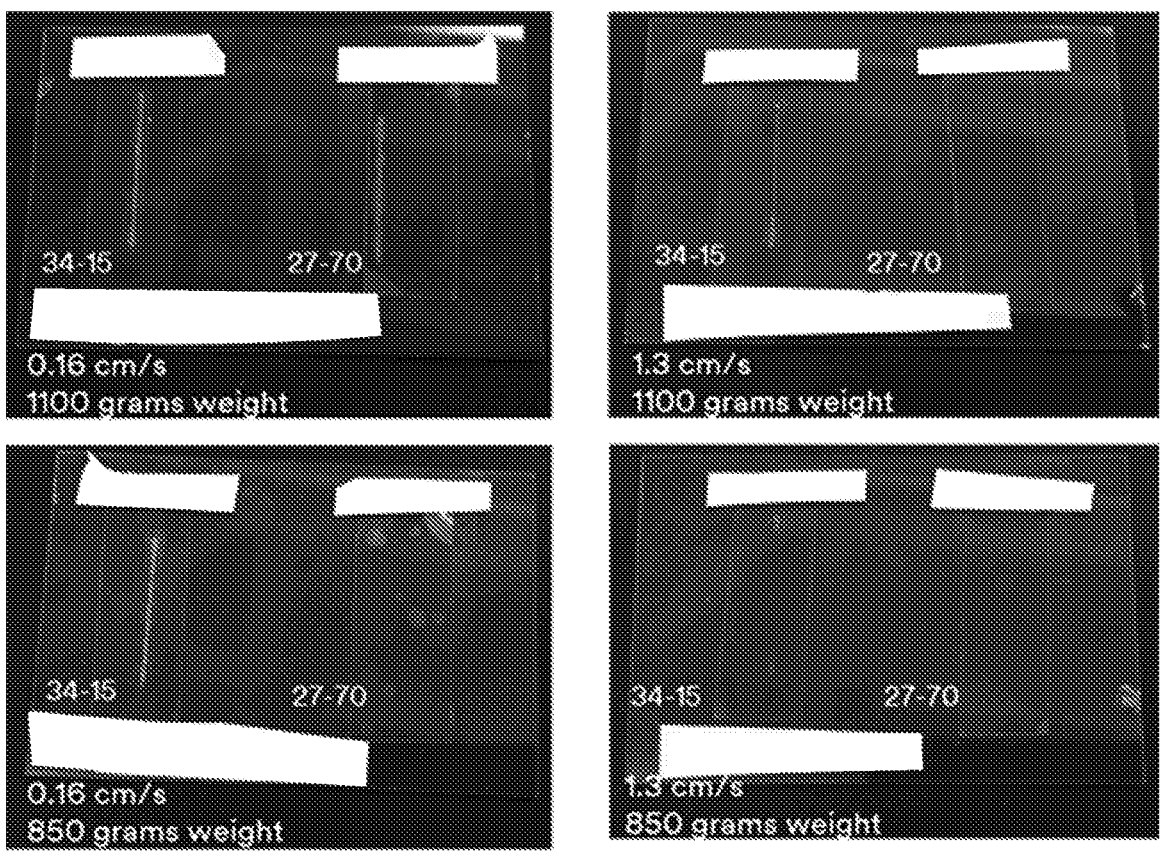

FIG. 7 shows photographs of scratch testing with the TABER Abraser for samples C17 and C14, which contains the same plasticizer loading (15%). At all speed and weights, the stylus impacted similar degree or more visible damage to the adhesive layer of C17 compared to C14, showing that LA410 as a polymer add did not enhance the scratch resistance properties of the adhesive. In these images, the samples are still laminated to the glass substrate, so the backing side is facing the camera.

Figure 8:
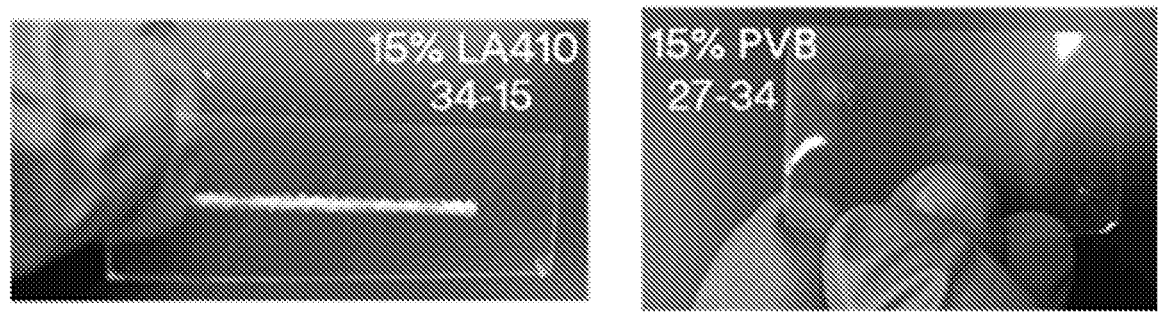

FIG. 8 shows photographs of scratch testing with the TABER Abraser for samples C17 and 21, at same weight and speed. In these images, the samples have been removed from the glass substrate and turned over, so the adhesive side is facing the camera. While the stylus did not impart permanent damage to samples with PVB (C17), sample with LA410 did not show the same scratch resistant behavior.

Shear Test Method

Static shear was determined according to the method of ASTM D3654-82 entitled, "Holding Power of Pressure-Sensitive Tapes," with the following modifications. The release liner(s), where present, was removed from the test sample. The conditions for CTH were 70° F. (21° C.) and 50% RH. For high humidity experiments the conditions were 90° F. (32° C.) and 90% RH. Samples of 1.27 cm (0.5 inch) wide by 7.62 cm (3 inch) long adhesive coated tape were die-cut in replicates of three. The first 1.27 cm (0.5 inch) of the adhesive in the length direction was adhered to the edge of the glass substrates of 5.08 cm (2 inch) by 5.08 cm (2 inch) by passing a 6.8 kg (15 lb) hand held roller over the length of the sample two times at a rate of 30.48 cm/min (12 in/min). The other side of the adhesive was folded onto itself and stapled to provide a hook type shape in order to hang a hanger and then weight. Samples were mounted on Static Shear stands (CHEMInstruments; Fairfield, Ohio).

The test sample was allowed to dwell on the test substrate for 1 hour at 21° C. and 50% RH for CTH testing and 90° F. (32° C.) and 90% RH for high humidity testing; thereafter a 2000 g, 3000 g, or 4000 g weight was applied to the hanger. The time to failure was recorded in minutes and the average value, calculated pursuant to procedures A and C of section 10.1 of the standard, for all of the test samples was reported. Four samples were tested and the average time to failure of the four samples was recorded.
Results are shown in Table 4.

TABLE 4

Sheer test results

| Example # | 6.6 lb/in² CTH | 6.6 lb/in² 90° F./90% RH | 8.8 lb/in² CTH |
|---|---|---|---|
| 1 | >17 | 1 | >17 |
| 2 | NT | NT | >17 |
| 3 | >17 | >17 | >17 |
| 4 | NT | NT | 0.77 |
| 5 | 0 | 0.33 | NT |
| 6 | 0 | 0 | NT |
| 7 | 0 | 0 | NT |
| 8 | 0 | 0 | NT |
| C1 | >17 | >17 | >17 |
| C2 | NT | NT | 0.03 |
| C3 | 0.33 | 0 | NT |
| C4 | 11.33 | 7.33 | NT |
| C5 | 0 | 0 | NT |
| C6 | 0 | 0 | NT |
| C7 | 0 | 0 | NT |
| C8 | NT | 0 | 17 |
| C9 | NT | 3.67 | 17 |
| C14 | 0 | 0 | NT |
| C15 | NT | NT | NT |
| C16 | NT | NT | NT |
| C17 | NT | NT | NT |

Additional Embodiments

The following exemplary embodiments are provided, the numbering of which is not to be construed as designating levels of importance:
1. A composition comprising:
  a) about 5 to about 40 parts by weight of a solute copolymer component optionally having one $T_g$ or $T_m$ of at least 25° C.;
  b) about 60 to about 95 parts by weight of a solvent monomer component comprising (meth)acrylate monomers and a multifunctional acrylate, wherein the sum of a) and b) is 100 parts by weight; and
  c) about 5 to about 100 parts of a plasticizer component, relative to 100 parts a) and b),
    wherein the plasticizer component comprises at least one plasticizer comprising an acid group.

2. The composition of embodiment 1, wherein the solvent monomer component comprises:
  d) about 5 to about 95 parts by weight of low $T_g$ monomers;
  e) about 0 to about 20 parts of an acid functional monomer;
  f) about 0 to about 20 parts of a non-acid functional polar monomer; and
  g) about 5 to about 40 parts of a multifunctional acrylate cross-linking agent, wherein the sum of d) to g) is 100 parts by weight.
3. The composition of embodiment 1, wherein the composition is a syrup polymer composition.
4. The composition of embodiment 3, wherein the syrup polymer composition has a viscosity of from about 500 to about 40,000 cPs at 22° C.
5. The composition of embodiment 1, wherein the solute copolymer is selected from a polyurethane, a polyester, a polyvinylpyrrolidone, a poly(methyl methacrylate), a poly(butyl acrylate), a polymer derived from a polyvinyl alcohol and an alkanal, a polyacrylonitrile, a polyolefin, a polyurea, a polybutadiene, a polystyrene, any copolymer thereof, and any combination thereof.
6. The composition of embodiment 5, wherein the alkanal has the structure:

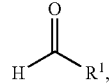

wherein $R^1$ is selected from $(C_1-C_{20})$hydrocarbyl.
7. The composition of embodiment 6, wherein $R^1$ is $(C_1-C_{20})$alkyl.
8. The composition of embodiment 5, wherein solute copolymer component comprises a poly(vinyl butyral).
9. The composition of embodiment 1, wherein the solute copolymer comprises a block copolymer of poly(methyl methacrylate) and poly(n-butyl acrylate).
10. The composition of embodiment 2, wherein the solvent monomer comprises about 0 to 15 parts by weight of acid-functional monomer and about 60 to about 90 parts by weight of the low $T_g$ monomer.
11. The composition of embodiment 1, wherein the solvent monomer component comprises about 20 to about 60 parts by weight of low $T_g$ monomer units.
12. The composition of embodiment 1, wherein at the solute copolymer is about 10 parts to about 20 parts by weight of the composition.
13. The composition of embodiment 2, wherein at least one of the acid functional monomer in the solvent monomer is at least one of capric acid, lauric acid, a fatty acid, oleic acid, citric acid, tartaric acid, malic acid, lactic acid, 2-ethyl hexanoic acid, myristic acid, phthalic acid, adipic acid, trimellitic acid, glutaric acid, hydrochloric acid, hypochlorous acid, chloric acid, sulfonic acid, benzenesulfonic acid, sulphonic acid, sulfuric acid, polysulfuric acid, peroxymonosulfuric acid, peroxydisulfuric acid, dithionic acid, thiosulfuric acid, disulfurous acid, sulfurous acid, dithionous acid, polythionic acid, thiosulfurous acid, acidic acid, phosphoric acids, phosphorous acids, phosphonic acids, and sebacic acid.
14. The composition of embodiment 2, wherein the non-acid functional polar monomer in the solvent monomer is ethylenically unsaturated hydroxyl containing monomer, an ethylenically unsaturated amine containing monomer, or a combination thereof.
15. The composition of embodiment 2, wherein the solvent monomer component comprises about 0 to about 15 parts by weight of the non-acid functional polar monomer.
16. The composition of embodiment 2, wherein the solvent monomer component comprises about 0 to about 15 parts by weight of the acid-functional monomer.
17. The composition of embodiment 1, wherein the composition comprises about 10 to about 80 parts of the plasticizer component, relative to 100 parts of a) and b).
18. The composition of embodiment 1, wherein the plasticizer comprising an acid is about 100 parts by weight of the plasticizer component.
19. The composition of embodiment 18, wherein the plasticizer comprising an acid is about 5 parts to about 99 parts by weight of the plasticizer component.
20. The composition of embodiment 18, wherein the plasticizer comprising the acid is at least one of capric acid, lauric acid, a fatty acid, oleic acid, citric acid, tartaric acid, malic acid, lactic acid, 2-ethyl hexanoic acid, myristic acid, phthalic acid, adipic acid, trimellitic acid, glutaric acid, and sebacic acid.
21. The composition of embodiment 18, wherein the plasticizer component further comprises at least one plasticizer that is free of an acid group.
22. The composition of embodiment 21, wherein the plasticizer that is free of an acid group is about 1 part to about 95 parts of the plasticizer component.
23. The composition of embodiment 21, wherein the plasticizer that is free of an acid group is about 5 parts to about 50 parts of the plasticizer component.
24. The composition of embodiment 1, wherein the plasticizer that is free of the acid group is at least one of aliphatic monoalkyl esters, aromatic monoalkyl esters, aliphatic polyalkyl esters, aromatic polyalkyl esters, polyalkyl esters of aliphatic alcohols, phosphonic polyalkyl esters, aliphatic poly(alkoxylated) esters, aromatic poly(alkoxylated) esters, poly(alkoxylated) ethers of aliphatic alcohols, and poly(alkoxylated) ethers of phenols.
25. A film formed from the composition of embodiment 1.
26. The film of embodiment 25, wherein the film is a cured adhesive film.
27. The cured adhesive film of embodiment 26, wherein the film is scratch resistant when subjected to a linear stroke of a stylus of having a speed of at least 0.16 cm/s and a weight applied to the stylus ranges from about 0 grams to about 1500 grams.
28. The cured adhesive film of embodiment 27, wherein the film is more scratch resistant than a corresponding film that is substantially free of the solute copolymer component.
29. The cured adhesive film of embodiment 26, wherein a 0.5 inch wide by 0.5 inch long sample of the film remains adhered to a substrate for a time ranging from approximately 10 minutes to 40 days when a force ranging from about 2 lbs/in.$^2$ to about 10 lbs/in$^t$ is applied to the film.
30. The cured adhesive film of embodiment 29, wherein the film remains adhered to the substrate for a time ranging up to about 30 days.
31. The cured adhesive film of embodiment 29, wherein the film remains adhered to the substrate for a time ranging from about 5 days to about 10 days.
32. The cured adhesive film of embodiment 26, wherein the film remains adhered to the substrate for a substantially longer period of time than a corresponding film that is substantially free of the solute copolymer component.
33. The cured adhesive film of embodiment 26, wherein a wet-out rate of the film ranges from about 0.5 s/in$^2$ to about 50 s/in$^2$.
34. The cured adhesive film of embodiment 26, wherein a wet-out rate of the film ranges from about 27 s/in$^2$ to about 40 s/in$^2$.
35. The cured adhesive film of embodiment 26, wherein a wet-out rate of the film ranges from about 0.5 s/in$^2$ to about 10 s/in$^2$.
36. The cured adhesive film of embodiment 26, wherein a force to peel the film from a glass substrate at a peel angle of 180 degrees and at a speed of 12 in/min ranges from about 0.1 N/dm to about 10 N/dm.
37. The cured adhesive film of embodiment 26, wherein a force to peel the film from a glass substrate at a peel angle of 180 degrees and at a speed of 12 in/min ranges from about 0.1 N/dm to about 5 N/dm.
38. The cured adhesive film of embodiment 26, wherein the cured adhesive film is applied to a polarizer.
39. An adhesive article comprising a layer of the cured adhesive film of embodiment 26 disposed on an optical film.
40. The adhesive article of embodiment 39 wherein the optical film is a multilayer optical film.
41. The adhesive article of embodiment 39 wherein the optical film is a microstructured optical film.
42. The adhesive article of embodiment 39 further comprising a release liner disposed on the surface of the cured adhesive film opposite the optical film.
43. A method of making a cured adhesive film comprising photopolymerizing the composition of embodiment 1.
44. A method of making a cured adhesive film comprising: forming a film of the composition of embodiment 1; and photopolymerizing the composition.
45. A method of making a cured adhesive film comprising: at least partially polymerizing a composition comprising
a) about 60 to about 95 parts by weight of a solvent monomer component comprising (meth)acrylate monomers and a multifunctional acrylate; and
b) about 5 to about 40 parts by weight of a solute copolymer component optionally having one $T_g$ or $T_m$ of at least 25° C.;
wherein the sum of a) and b) is 100 parts by weight; to give an at least partially polymerized composition.
46. The method of embodiment 45, further comprising:
c) adding about 5 to about 40 parts of a multifunctional acrylate cross-linking agent; and
d) about 5 to about 100 parts of a plasticizer, relative to 100 parts a) and e) to the at least partially polymerized composition to obtain a second composition; and
e) further photopolymerizing the second composition.

The invention claimed is:
1. A composition comprising:
a) about 5 to about 40 parts by weight of a solute copolymer component having one Tg or Tm of at least 25° C.;
b) about 60 to about 95 parts by weight of a solvent monomer component comprising (meth)acrylate monomers and a multifunctional acrylate,
wherein the sum of a) and b) is 100 parts by weight; and
c) about 5 to about 100 parts of a plasticizer component, relative to 100 parts a) and b), wherein the plasticizer component comprises at least one plasticizer comprising an acid group.

2. The composition of claim 1, wherein the solvent monomer component comprises:
   d) about 5 to about 95 parts by weight of at least one low Tg monomer;
   e) about 0 to about 20 parts of an acid functional monomer;
   f) about 0 to about 20 parts of a non-acid functional polar monomer; and
   g) about 5 to about 40 parts of a multifunctional acrylate cross-linking agent,
   wherein the sum of d) to g) is 100 parts by weight.

3. The composition of claim 1, wherein the composition is a syrup polymer composition.

4. The composition of claim 1, wherein solute copolymer component comprises a poly(vinyl butyral).

5. The composition of claim 1, wherein the solute copolymer comprises a block copolymer of poly(methyl methacrylate) and poly(n-butyl acrylate).

6. The composition of claim 2, wherein the solvent monomer comprises about 0 to 15 parts by weight of acid-functional monomer and about 60 to about 90 parts by weight of the low Tg monomer.

7. The composition of claim 2, wherein at least one of the acid functional monomers in the solvent monomer is selected from the group consisting of: capric acid, lauric acid, a fatty acid, oleic acid, citric acid, tartaric acid, malic acid, lactic acid, 2-ethyl hexanoic acid, myristic acid, phthalic acid, adipic acid, trimellitic acid, glutaric acid, hydrocholroic acid, hypochlorous acid, chloric acid, sulfonic acid, benzenesulfonic acid, sulphonic acid, sulfuric acid, polysulfuric acid, peroxymonosulfuric acid, peroxydisulfuric acid, dithionic acid, thiosulfuric acid, disulfurous acid, sulfurous acid, dithionous acid, polythionic acid, thiosulfurous acid, acidic acid, phosphoric acids, phosphorous acids, phosphonic acids, and sebacic acid.

8. The composition of claim 2, wherein the non-acid functional polar monomer in the solvent monomer is ethylenically unsaturated hydroxyl containing monomer, an ethylenically unsaturated amine containing monomer, or a combination thereof.

9. The composition of claim 1, wherein the composition comprises about 10 to about 80 parts of the plasticizer component, relative to 100 parts of a) and b).

10. The composition of claim 1, wherein the plasticizer comprising an acid is about 100 parts by weight of the plasticizer component.

11. The composition of claim 10, wherein the plasticizer comprising an acid is about 5 parts to about 99 parts by weight of the plasticizer component.

12. The composition of claim 10, wherein the plasticizer comprising the acid is selected from the group consisting of: capric acid, lauric acid, a fatty acid, oleic acid, citric acid, tartaric acid, malic acid, lactic acid, 2-ethyl hexanoic acid, myristic acid, phthalic acid, adipic acid, trimellitic acid, glutaric acid, and sebacic acid.

13. The composition of claim 10, wherein the plasticizer component further comprises at least one plasticizer that is free of an acid group.

14. The composition of claim 13, wherein the plasticizer that is free of an acid group is about 5 parts to about 50 parts of the plasticizer component.

15. A cured adhesive film formed from the composition of claim 1.

16. The cured adhesive film of claim 15, wherein the film is scratch resistant when subjected to a linear stroke of a stylus of having a speed of at least 0.16 cm/s and a weight applied to the stylus ranges from about 0 grams to about 1500 grams.

17. The cured adhesive film of claim 15, wherein a 0.5 inch wide by 0.5 inch long sample of the film remains adhered to a substrate for a time ranging from approximately 10 minutes to 40 days when a force ranging from about 2 lbs/in.2 to about 10 lbs/in2 is applied to the film, and wherein the film remains adhered to the substrate for a substantially longer period of time than a corresponding film that is substantially free of the solute copolymer component.

18. The cured adhesive film of claim 15, wherein the cured adhesive film is applied to a polarizer.

19. An adhesive article comprising a layer of the cured adhesive film of claim 15 disposed on an optical film.

20. The adhesive article of claim 19 wherein the optical film is at least one of a multilayer optical film and a microstructured optical film.

* * * * *